(12) United States Patent
Inoh (10) Patent No.: US 12,158,334 B2
(45) Date of Patent: Dec. 3, 2024

(54) ULTRASONIC PROBE AND METHOD FOR MEASURING THICKNESS OF PIPE BEING INSPECTED USING THE SAME

(71) Applicants: HIBOT CORPORATION, Tokyo (JP); EBARA Environmental Plant Co., Ltd., Tokyo (JP)

(72) Inventor: Takao Inoh, Tokyo (JP)

(73) Assignees: HIBOT CORPORATION, Tokyo (JP); EBARA Environmental Plant Co., Ltd., Tokyo (JP)

(*) Notice: Subject to any disclaimer, the term of this patent is extended or adjusted under 35 U.S.C. 154(b) by 595 days.

(21) Appl. No.: 17/309,164

(22) PCT Filed: Oct. 31, 2019

(86) PCT No.: PCT/JP2019/042919
§ 371 (c)(1),
(2) Date: May 2, 2021

(87) PCT Pub. No.: WO2020/091011
PCT Pub. Date: May 7, 2020

(65) Prior Publication Data
US 2022/0011099 A1    Jan. 13, 2022

(30) Foreign Application Priority Data
Nov. 1, 2018 (JP) .................. 2018-206470

(51) Int. Cl.
  *G01B 17/02*    (2006.01)
  *G01N 29/04*    (2006.01)

(52) U.S. Cl.
  CPC ........... *G01B 17/02* (2013.01); *G01N 29/041* (2013.01); *G01N 2291/02854* (2013.01); *G01N 2291/105* (2013.01); *G01N 2291/2636* (2013.01)

(58) Field of Classification Search
None
See application file for complete search history.

(56) References Cited

U.S. PATENT DOCUMENTS

| | | | |
|---|---|---|---|
| 4,391,143 A * | 7/1983 | Cook | G01N 29/265 310/335 |
| 4,955,235 A * | 9/1990 | Metala | G01N 27/902 324/226 |

(Continued)

FOREIGN PATENT DOCUMENTS

| | | |
|---|---|---|
| JP | S59-155709 A | 9/1984 |
| JP | S61-31962 A | 2/1986 |

(Continued)

OTHER PUBLICATIONS

WIPO, Japanese International Search Authority, International Search Report (with English translation) and Written Opinion mailed on Jan. 7, 2020 in International Patent Application No. PCT/JP2019/042919, 9 pages.

(Continued)

*Primary Examiner* — Raul J Rios Russo
*Assistant Examiner* — Carl F. R. Tchatchouang
(74) *Attorney, Agent, or Firm* — MASUVALLEY & PARTNERS; Peter Martinez (57) ABSTRACT

[Problem] When a beam is emitted from inside a pipe onto an inside surface of the pipe using an ultrasonic probe in which flat plate-like transducers are arranged, since the transduces are in the shape of flat shape, signals reflected from the tubular pipe wall do not always return straight to the transducers, and scattering and interferences occurs in the returning waves.
[Solution] An ultrasonic transducer according to the present application is curved to match the internal shape of the pipe, and therefore ultrasonic waves emitted from the transducers are radiated perpendicular to the pipe wall, and reflected (Continued)

echo signals thereof are also reflected and return perpendicularly from the irradiated pipe wall, and thus scattering and interference occur less than with ultrasonic waves and reflected waves emitted from flat plate-like transducers arranged in positions at oblique angles with respect to the pipe wall, and it is therefore possible to obtain clear data by selecting ultrasonic waves having a wavelength corresponding to the thickness of the pipe.

5 Claims, 5 Drawing Sheets

(56) References Cited

U.S. PATENT DOCUMENTS

| | | | |
|---|---|---|---|
| 5,460,046 A | 10/1995 | Maltby et al. | |
| 7,293,461 B1 * | 11/2007 | Girndt | G01N 29/04 |
| | | | 73/628 |
| 2003/0188589 A1 * | 10/2003 | Harthorn | G01N 29/265 |
| | | | 73/865.8 |

FOREIGN PATENT DOCUMENTS

| | | | | |
|---|---|---|---|---|
| JP | S62-83608 | A | | 4/1987 |
| JP | S63-33457 | U | | 3/1988 |
| JP | H04-051658 | U | | 4/1992 |
| JP | H04-315910 | A | | 11/1992 |
| JP | H07-318336 | A | | 12/1995 |
| JP | H09-53926 | A | | 2/1997 |
| JP | 11133006 | A | * | 5/1999 |
| JP | H11-133006 | A | | 5/1999 |
| JP | 2002-090352 | A | | 3/2002 |
| JP | 2002-365033 | A | | 12/2002 |
| JP | 2010271072 | A | * | 12/2010 |
| JP | 2011075384 | A | * | 4/2011 ........... G01N 29/041 |

OTHER PUBLICATIONS

European Patent Office, European Search Report issued on Oct. 27, 2021 for European Patent Application No. 1987632, 2 pages.

* cited by examiner

ULTRASONIC PROBE AND METHOD FOR MEASURING THICKNESS OF PIPE BEING INSPECTED USING THE SAME

RELATED APPLICATIONS

This application is the U.S. National Phase of and claims priority to International Patent Application No. PCT/JP2019/042919, International Filing Date Oct. 31, 2019; which claims benefit of Japanese Patent Application No. 2018-206470 filed Nov. 1, 2018 both of which are incorporated herein by reference in their entireties.

TECHNICAL FIELD

The present invention relates to an ultrasonic probe and method for measuring thickness of a pipe to be inspected with using the ultrasonic probe.

BACKGROUND

Conventionally, as a non-destructive inspection method, a so-called flaw inspection using ultrasonic wave has been widely well-known. In such flaw inspection, ultrasonic wave enters a material to be inspected, then reflected wave or transmitted wave derived from the ultrasonic wave is measured to assess flaws in the material to be inspected, thickness of pipes, etc.

In general, various kinds of boiler devices, where fluid flows under high temperature or high pressure, are used under harsh environment. Thus, the boiler devices or members used therein can be damaged. Therefore, periodically inspect to assess flaws, crack, reduction of thickness or the like that occurs in the pipe members of the devices is necessary. There is a method for cutting pipes of boilers and inserting a test device to detect flaws, cracks, reduction of thickness or the like. It requires a lot of time and many costs. Furthermore, there are various types of boiler pipes, each of pipes are gathered, or each of them are not easily accessible from the outside of the pipes.

Accordingly, conventionally disclosed is a flaw inspection device for inspecting whether flaws, cracks, reduction of thickness or the like occurs in a pipe by an inspecting device inserted within the pipe through the opening provided on main pipes, and an inspection method using the device. General type of a flaw inspection device that includes an ultrasonic probe has been disclosed.

CITATION LIST

Patent Publication

Patent Publication 1: Japanese Patent Publication S62-83608
Patent Publication 2: Japanese Patent Publication 2002-365033
Patent Publication 3: Japanese Utility Model Publication H04-051658

Patent Publication 1 discloses a measuring device for measuring thickness of a pipe, from inside, to be used in a pipeline by means of an ultrasonic probe. In prior arts in measuring thickness of a pipe used in pipeline, it has been possible to accurately measure the thickness in case where materials transported by the pipeline is liquid. However, in case where gas flows, since the pipe cannot be easily filled with liquid, it then has been impossible to measure the thickness with using ultrasonic wave. The invention disclosed in Patent Publication 1 provide a thickness measuring device that can accurately measure the pipe thickness from inside of the pipe, even if the pipe is not filled with liquid. Ultrasonic probes are embedded in an annular seal cup of the device that is contact with the inner peripheral surface of the pipe. In such a pipe thickness measuring device of Patent Publication 1, the annular seal cup formed of elastic material and pressed against the inner peripheral surface of the pipe is mounted on a moving body that moves along an axial direction inside the pipe. Further, by installing, at a plurality of positions of the seal cup, a plurality of ultrasonic probes each of which transmits ultrasonic wave toward the inner peripheral surfaces of the pipe, each of the ultrasonic probes is arranged to transmit ultrasonic wave and to receive the same reflected both at the inner surface and at the outer surface of the pipe. The thickness of the pipe can be thus calculated in accordance with the arrival times difference between the wave reflected at the inner peripheral surface of the pipe to be inspected and the wave reflected at the outer peripheral surface of the pipe.

Patent Publication 2 discloses a tube wall thickness measuring device which is arranged to be inserted within a tube to be measured, and which is also movable along a coaxial direction of the tube. In the tube wall thickness measuring device, provided is a tubular rotating body rotated by a water flow between two disc-shaped flanges having an outer diameter smaller than the inner diameter of the tube. Further, also provided is, in the rotating body, an acoustic mirror that refracts ultrasonic wave having been emitted along the axial direction toward a tube radial direction. In the front side flange, further provided is an ultrasonic wave probe for emitting the ultrasonic wave toward the acoustic mirror. With moving the wall thickness measuring device inside the tube to be measured, water is supplied into the rotating body from the rear flange, and the rotating body is rotated by the water flow ejected from the ejection port in the circumferential direction. Whereas, through the acoustic mirror, by refracting the ultrasonic waves emitted from the ultrasonic probe toward the axial direction of the tube, the ultrasonic waves spirally move along the coaxial direction. The tube wall thickness, within the whole length and around the whole circumference, thus can be measured.

Patent Publication 3 relates to an ultrasonic probe used for flaw inspection of a pipe. In a conventional ultrasonic probe including a transducer inserted in a pipe for emitting ultrasonic beam, the emitted ultrasonic beam refracts when entering inside of a pipe to be inspected. Emitting surface of the transducer is flat, but the entering surface of the pipe to which the beam enters curves. Each of beam entering angles are different from each other due to positions of the transducer. Under these circumstances, since the entering beam scatters within the pipe, it is thus not possible to clearly detect the reflected beams. With using the ultrasonic probe disclosed in Patent Publication 3, in order to solve such drawbacks of the prior art, the transducers installed in the ultrasonic probe are arranged to have a concave curved surface opposing, from the coaxial direction of the pipe, to the inner surface of the pipe. Ultrasonic beams emitted from such formed transducers converge at a predetermined position within the pipe regardless of position of the ultrasonic probe, and the beam propagates within the pipe without scattering. As a result, the ultrasonic beam can propagate with being converged within the pipe.

SUMMARY OF THE INVENTION

Problem to be Solved

In the measuring device disclosed in Patent Publication 1, the materials to be transferred through the pipe is gas. Thus, an annular seal cup in which an ultrasonic probe has been mounted on circumference of the seal cup is thus arranged to be pressed against the inner peripheral surface of the pipe. It is then possible for the thickness measuring device of Patent Publication 1 to calculate thickness of the pipe based on the difference of the arrival times between the wave reflected from the inner peripheral surface and one reflected from the outer peripheral surface. In the measuring device, since water is not used as a propagation medium, it is thus necessary to employ an arrangement in which a plurality of probes is mounted within a seal cup to be pressed against the inner peripheral surface of the pipe. Such ultrasonic probe can be used only for a pipe with specified diameter. When using it to a different diameter pipe, it is necessary to match diameter of the seal cup, in which the probe is provided, with the pipe's diameter. The measuring device is thus not suitable for various kinds of pipe diameters. Furthermore, in the ultrasonic probe disclosed in Patent Publication 1 with a plurality of probes provided on circumference of the seal cup, in spite of providing a plurality of probes, it is not possible to serially and fully inspect the whole area of the inner surface of pipe (See Patent Publication 1, FIG. 3). Since the ultrasonic probe moves within the pipe by compressed air (Publication 1, page (3), upper left column), it is then hard to control the movement of the probe as compared to the movement within the pipe by water flow (Publication 1, movable member VIG 2).

The tube wall thickness measuring device disclosed in Patent Publication 2 is arranged to measure tube wall thickness with moving inside the tube by an ultrasonic probe from inside of the tube to be inspected. In such a tube wall thickness measuring device, provided is a tubular rotating body rotated by a water flow between two disc-shaped flanges having outer diameter smaller than the inner diameter of the tube. Further, also provided in the rotating body an acoustic mirror, inclined in an oblique angle such as 45-degrees, that refracts ultrasonic wave having been emitted along the axial direction into a tube radial direction. The ultrasonic probe provided on the front flange receives the ultrasonic waves emitted toward the acoustic mirror and measures the thickness of the tube. For moving the ultrasonic probe, a string member is used. In the tube wall thickness measuring device disclosed in Patent Publication 2, the ultrasonic wave having been emitted from the ultrasonic probe is reflected and refracted at the acoustic mirror provided in the tubular rotating body. Since the rotating mirror moves forward during such reflection and refraction, there is a gap among parts in the tube, which is to be inspected by the ultrasonic wave. Thus, there is a risk that inspection omission may occur depending on the moving speed of the device and the rotation speed of the mirror. Furthermore, the rotating body is arranged to rotate by the pressure of flowing water outputted from an opening on the rotating body, and there is also a risk that bubble may undesirably generates. Since the water for rotating the rotating body is supplied from a water supply tube, the whole construction of the device is complicated.

In the ultrasonic probe used for flaw inspection disclosed in Patent Publication 3, the transducers installed in the ultrasonic probe are arranged to have a concaved curve surface opposing, from the coaxial direction of the pipe, to the inner surface of the pipe. Ultrasonic beams emitted from such formed transducers converge at a predetermined position within the pipe regardless of position of the ultrasonic probe. The shape of it is the curved surface, so as the ultrasonic beams emitted from the transducer converge at the predetermined position within the pipe regardless of the position of the probe (FIGS. 1 and 2). Accordingly, in Patent Publication 3, ultrasonic waves from the transducer do not perpendicularly enter the inner surface of the pipe.

Means for Solving the Problem

According to the present invention, in order to solve the above-identified problem, there is provided an ultrasonic probe which is movable within a pipe by water flow pressure for detecting abnormality of the pipe and for measuring thickness of the pipe. The ultrasonic probe is further arranged to transmit ultrasonic wave toward the inner surface of the pipe, and to receive the transmitted wave reflected at the inner surface as an echo signal. The present invention is thus characterized in that a plurality of transducers are mounted on circumference of a cylindrical main body, and that the transducers are so curved as to match the shape of the inner surface of the pipe. In the present invention, since a plurality of transducers are located with being so curved as to match the shape of the inner surface of the pipe, the ultrasonic waves having been emitted from the transducers are then perpendicularly radiated onto the surface of the pipe to be inspected. The waves are also perpendicularly reflected from the surface and detected as an echo signal to the transducers. Accordingly, as compared to a condition that the waves are emitted and received from the transducers inclined about the surface to be inspected, it is possible to suppress scattering or interference and to clearly obtain the data by selecting and using ultrasonic wave with wave lengths which corresponds to the thickness of pipe to be inspected. In the probe according to the present invention, a plurality of transducers, an outer surface of which curves, can be located on circumference of a cylindrical main body. These transducers can also be located, for example, continuously on the circumference of the main body. By employing such an arrangement, it becomes unnecessary to rotate the main body so that the transducers correctly oppose to the position on the surface which has not been opposed to the transducers for additionally emitting ultrasonic beam, which are necessary when using single or a few transducers. The ultrasonic probe according to the present invention can be also arranged to be supported by a buoyant main body, and by an optional guiding and buoyant unit which is buoyant and has resistance against water flow. Further, the ultrasonic probe further has sealing property against water. Thus, the probe easily floats and moves within the pipe, and easily inspect the pipe to be inspected.

Below the first embodiment of the present invention is disclosed.

An ultrasonic probe according to the present invention is the ultrasonic probe movable within a pipe to be inspected for measuring thickness of the pipe from its inside, comprising:

a) a cylindrical main body, b) a plurality of transducers provided around peripheral of the main body, c) a member for matching central axis of the pipe to be inspected and central axis of the main body, and d) another member for causing the main body to move within the pipe, wherein shape of each of the transducers is so curved as to match the shape of the inner surface of the pipe to be inspected.

An ultrasonic probe according to the present invention may be the ultrasonic probe wherein the transducers are concentrically provided about the central axis of the main body.

An ultrasonic probe according to the present invention may be the ultrasonic probe, wherein the transducers are arranged to perpendicularly emit ultrasonic wave toward an inner surface of the pipe, so that the wave perpendicularly reflected from the inner surface can be detected at the transducers.

An ultrasonic probe according to the present invention may be the ultrasonic probe wherein the main body is cylindrical, and wherein the transducers, the surface of which is so curved, are provided at positions circularly designated around the main body, so that the transducers perpendicularly radiate ultrasonic wave onto the inner surface of the pipe and detect perpendicularly reflected waves.

An ultrasonic probe according to the present invention can be used for a method for measuring thickness of a pipe to be inspected by a cylindrical ultrasonic probe, wherein the method can comprise the steps of:

1) inserting an ultrasonic probe including a plurality of transducers provided around a main body into a pipe to be inspected;

2) radiating ultrasonic waves perpendicularly onto an inner surface of the pipe, and detecting the reflected wave;

3) determining thickness of the pipe.

Advantageous Effect of the Invention

The ultrasonic probe according to the present invention is arranged to be movable within a pipe to be inspected by water flow, and to include a cylindrical main body which is coaxially provided with the pipe by a main body stably supporting unit. A plurality of transducers located along circumference of the main body are formed in a curved shape to match the shape of the inner surface of the pipe. The ultrasonic waves having been emitted from the transducers are then perpendicularly radiated onto the surface of the pipe to be inspected. The waves are also perpendicularly reflected and returned to the transducers from the surface as an echo signal. Accordingly, it is possible to clearly obtain the measured data without scattering or interference among the emitted and reflected ultrasonic waves. Also, in the ultrasonic probe of the present invention, it is possible to replace the portion including the main body stably supporting unit with another one depending on the pipe diameter to be inspected. It is thus possible for the ultrasonic probe to inspect various types of pipes, respectively having its own diameter, by replacing parts of the device, which is significant effects.

DETAILED DESCRIPTION OF EMBODIMENTS

Figure 1:
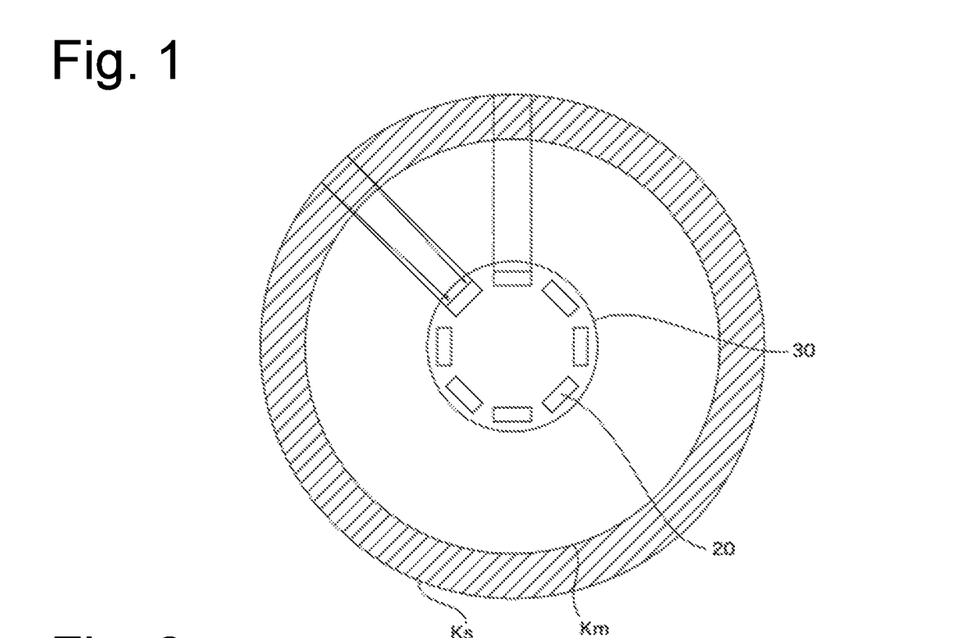
FIG. 1 One example of the expected beam path in case where a conventional ultrasonic probe including a plate-shaped transducers emit beams toward the inner surface of a pipe from inside thereof FIG. 2 One example of the beam path (emission, reflection) in case where an ultrasonic probe of the present invention including transducers having been mounted around circumference of a main body emit beams perpendicularly toward the inner surface of a pipe.
Figure 2:
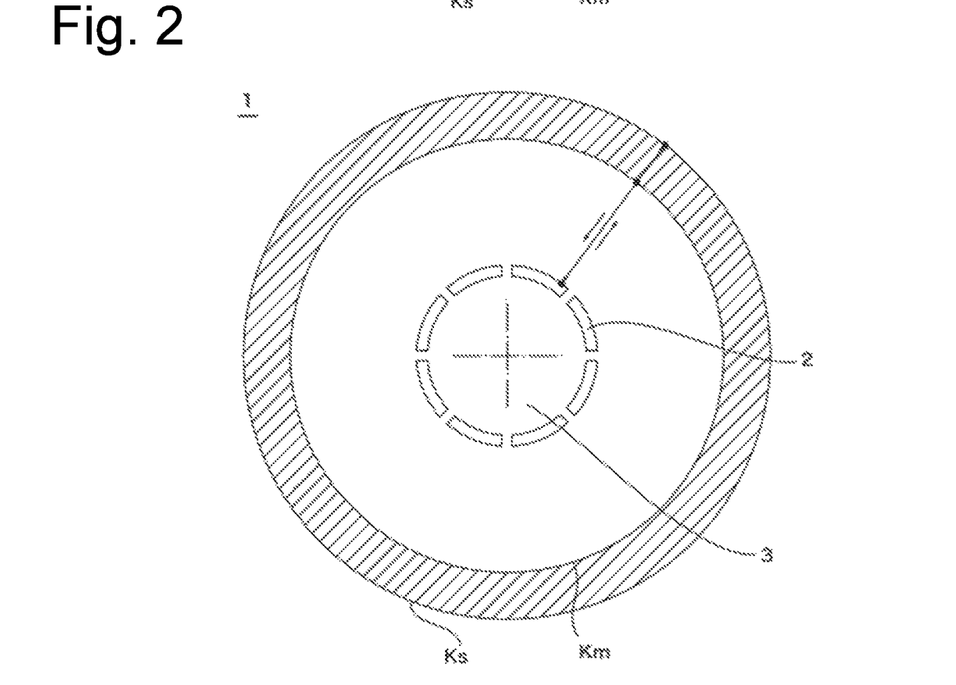

With referring to the drawings, the first embodiment of an ultrasonic probe according to the present invention is described below. FIG. 1 shows a conventional ultrasonic probe inserted within a pipe to be inspected which has a cylindrical main body 30 and one or more plate-shaped transducer(s) 20 mounted on circumference of the main body. FIG. 2 shows an ultrasonic probe according to the present invention inserted within a pipe to be inspected which has a cylindrical main body 3 and one or more curved surface transducer(s) 2 mounted on circumference of the main body. It is preferable to employ a material and a shape of the main body in such a manner that the main body can be easily inserted into a pipe, that the main body can easily move along a longitudinal direction of the pipe with stably floating on flowing water, and that the length and the flexibility of the main body is so appropriate as to easily pass-through bent portions of the pipe.

Figure 3:
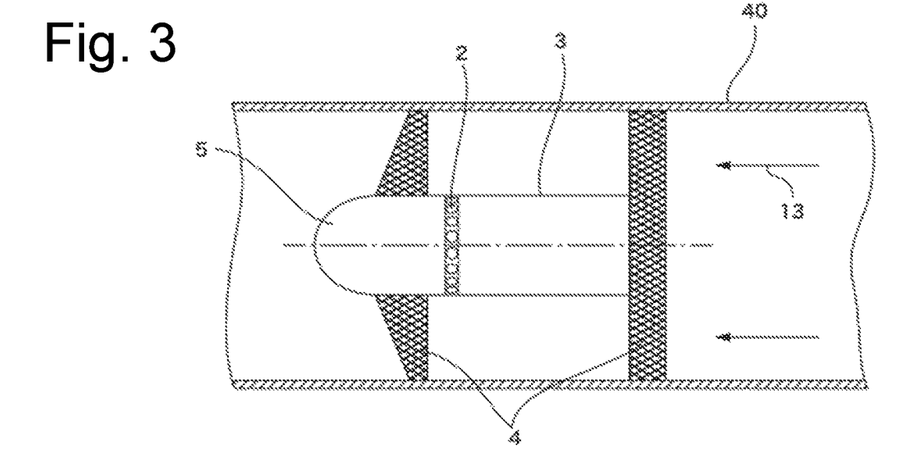
FIG. 3 One example of the first embodiment of the probe, inserted in a pipe to be inspected, according to the present invention including the main body with transducers mounted on the circumference thereof.
Figure 4:
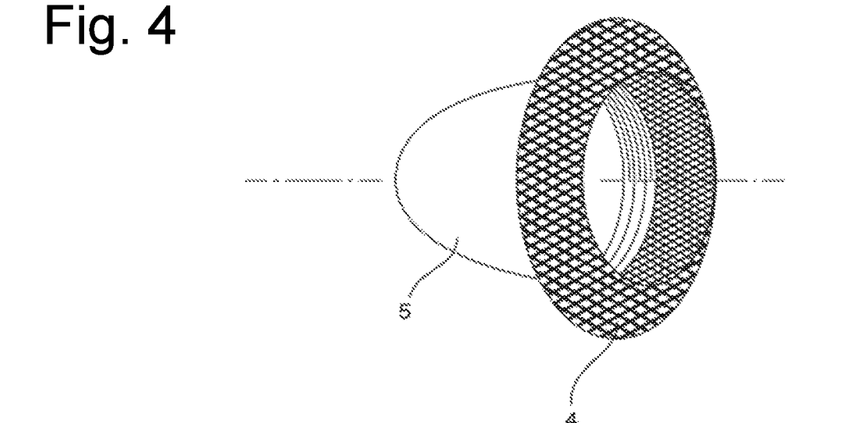
FIG. 4 A perspective view of one example of both a main body stably supporting unit and a guiding unit, respectively provided in the front side, of the present invention.
Figure 5:
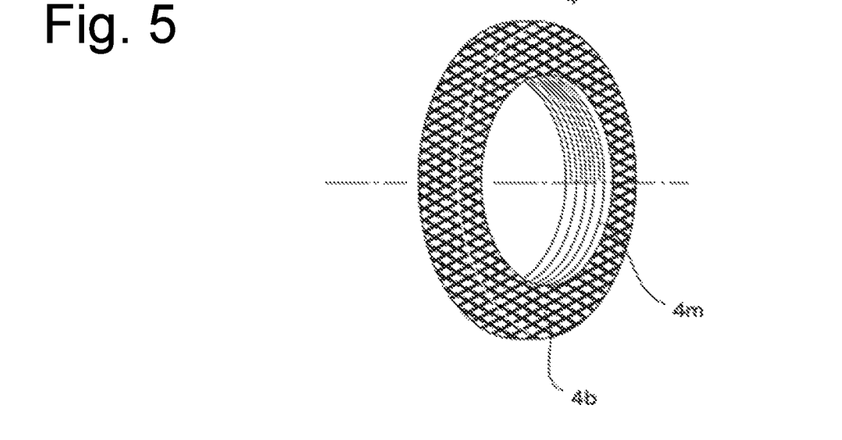
FIG. 5 A perspective view of one example of a main body stably supporting unit, provided in the rear side, of the present invention.

The shape of the main body is not necessarily cylindrical; however, considering that a cross section of a boiler pipe to be inspected is usually circular, it is preferable to make the shape cylindrical. In order to easily insert the ultrasonic probe into a pipe to be inspected, a guiding unit 5 is provided at the tip (the traveling direction) of the main body (FIG. 3). Any shape of the guiding unit 5, which enable the ultrasonic probe to be easily inserted into the pipe, can be employed. Also in order to easily move by running water within the pipe, the diameter of front part may be smaller than the pipe diameter, and a cross section of the front part may also be concentric with a cross section of the pipe perpendicular to the central axis. The central part of the front portion of the main body may be conically liked formed having a rounded tip portion (i.e., in a triangularly-shaped in a side view) with respect to the traveling direction of the main body. The main body including a conically tip front portion allow the ultrasonic probe to move within the pipe with reduced resistance against water flow. In the main body, there is also provided a main body stably supporting unit 4 as a buffering portion between the inner surface of the pipe and the main body. The main body stably supporting unit 4 surrounds the main body from the peripheral of the front portion toward backward direction with tilting in predetermined angle, and matches the central axes of the pipe to be inspected and the main body. In order to reduce resistance against the water flow, it is preferable to so form both the central portion at the front potion and the peripheral portion thereof of the main body as to smoothly link to the main body stably supporting unit 4.

The main body stably supporting unit 4 for placing the main body 3 at the central portion within the pipe to be inspected is elastic and umbrella-shaped, at the side view, and is also formed, for example, in coarse mesh by metal. The main body stably supporting unit can match the central axis along the longitudinal direction of the main body with the central axis of the pipe. Accordingly, with using the transducers circularly mounted around the main body, it is possible to perpendicularly radiate ultrasonic beam emitted from the transducers onto the inner surface of the pipe. Furthermore, since the main body stably supporting unit is formed in coarse mesh state, the water flow passing through the mesh can also smoothly flow between the main body and the inner surface of the pipe. There is always water as a wave propagation medium between such circularly arranged transducers around the main body and the part to be inspected on the inner surface of the pipe.

Figure 12:
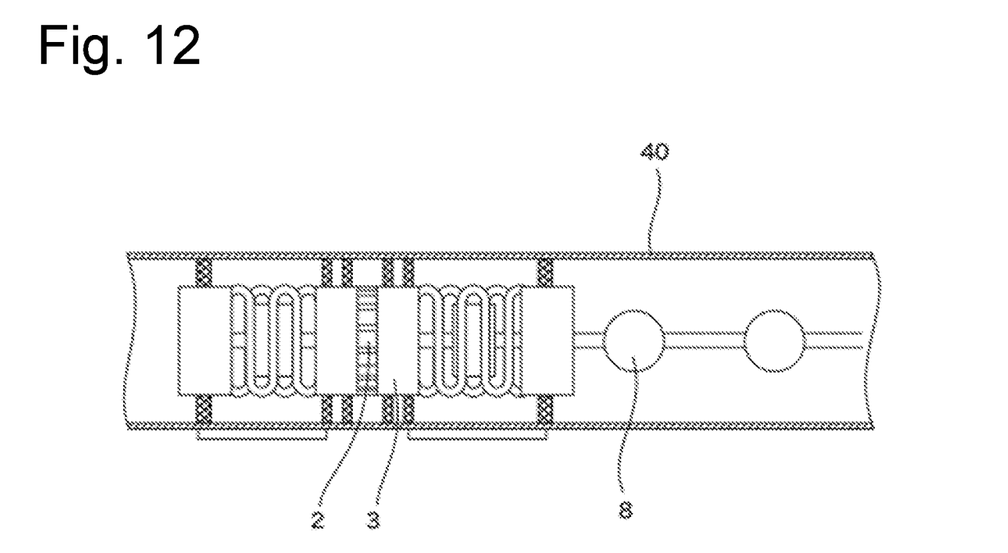
FIG. 12 One embodiment of the ultrasonic probe according to the present invention including the main body stably supporting unit, which is located at the front and the rear side of the main body, including movable joint members covered with an elastic coil.

The main body stably supporting unit 4 is not necessarily an elastic and umbrella-shaped unit also with being formed in coarse mesh by metal which extends from the peripheral of the front portion toward backward direction with tilting in predetermined angle, on the condition that the unit 4 can stably place the main body 3 within the pipe. Both the shape and the material of the main body stably supporting unit 4 does not matter on the condition that the central axes of the pipe to be inspected and the main body are matched with each other, and that water flow is not prevented from smoothly flowing between the inner surface of the pipe and the main body. As one aspect of the present invention, rectangular members made of flexible materials can be placed on circumference of the main body in an evenly spaced manner (FIG. 12).

At the rear side portion of the main body 3 along the longitudinal direction, there can be provided a metallic, elastic and coarse mesh-formed ring member (a rear side main body stably supporting unit 4b), which is analogous to the previously described main body stably supporting unit. With providing such an arranged member, it becomes possible to match the central axes of the pipe to be inspected and the main body, and to make the water in the pipe flowed more smoothly between the inner surface of the pipe and the main body. The shape and the material of the ring at the rear side portion does not matter, same as the main body stably supporting unit 4 provided at the front side of the main body, as long as the same effects are brought about.

Each of the guide portion at front portion of the main body and the main body stably supporting units 4a or 4b can be arranged to be connected to the main body including a plurality of transducers around the circumference thereof by for example, connecting screws or being detachable from the main body. Accordingly, even if the diameters of pipes to be inspected are different from each other, by replacing the main body stably supporting units 4a and 4b, the diameters of which match with the sizes of pipes to be used, the same main body and its transducers 2 mounted therein can be used without being changed. The shape of the transducers 2 has been formed with being so curved as to be matched with the shape of the inner surface of the pipe to be inspected. As a result, since the waves emitted from the transducers are about perpendicularly radiated onto the inner surface, the reflected waves also propagate perpendicularly, thus clear inspection results are obtainable.

Considering the restrictions based on, for example, its weight, capacity and pipe diameter of the pipe, an ultrasonic wave transmitting unit, a receiving unit for receiving the reflected wave, a controlling unit, a power supplying unit, etc., can be packed in a water-proof buoyant linking unit 9 (distinct from the main body) that is connected to the main body by a flexible linking string.

Furthermore, one aspect in which the position of the ultrasonic probe within the pipe can measure the subject by a wire that extends from the rear part thereof is within the scope of the present invention. In such aspect, the position of the ultrasonic probe may be measured by providing a plurality of evenly spaced buoyant and guide units for easily inserting the probe into the pipe, or by measuring the remaining length of the wire outside the pipe to be inspected (FIG. 12).

With referring to the drawings, the construction, function or the like of the ultrasonic probe, including modification examples thereof, are described below.

As previously described, the shape, material or the like of the main body 3 of the ultrasonic probe of the present invention do not matter on the condition that the main body may be easily inserted into the pipe, and that wall thickness of the pipe may be measured by ultrasonic beam generated at the transducers 2 with being moved by water flow from the rear side of the pipe. In general, the cross section of the pipe to be inspected is circular. It is then preferable to form the main body 3 cylindrically, and the diameter of the cross section of the main body is smaller than that of the pipe; however the shape of the cross section is not strictly limited to cylindrical. The diameter of the main body 3 is not particularly limited to the condition that the ultrasonic probe can move within the pipe by water flow. The main body 3 moves by water flow 13 from the rear side. The transducers 2 are located circularly around the main body. Thus, the main body have the certain size of the diameter. If the probe can easily pass through the bent portion of the pipe, and if, considering both the material of the pipe to be inspected and propagation velocity within water of the wave, the width of cross section of the main body with respect to the traveling direction thereof is substantially similar to the diameter of the pipe, the ultrasonic probe can effectively receive the pressure of the water flow thus easily moving within the pipe.

It is preferable that the ultrasonic probe has its specific gravity substantially the same as that of water because the material and the weight thereof are required in such a manner that the probe may move without being prevented from moving by excessive buoyancy and gravity within water. The material and the weight are not necessarily limited as such, and the ultrasonic probe may have its material, volume and weight so that it moves smoothly by water flow.

Figure 9:
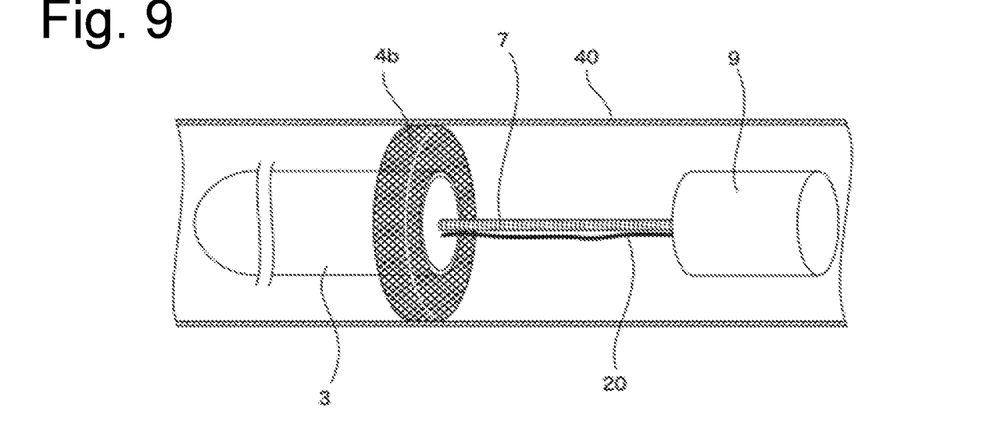
FIG. 9 A perspective view of one example of a buoyant and linking unit linked with the main body by a flexible linking string member.
Figure 10:
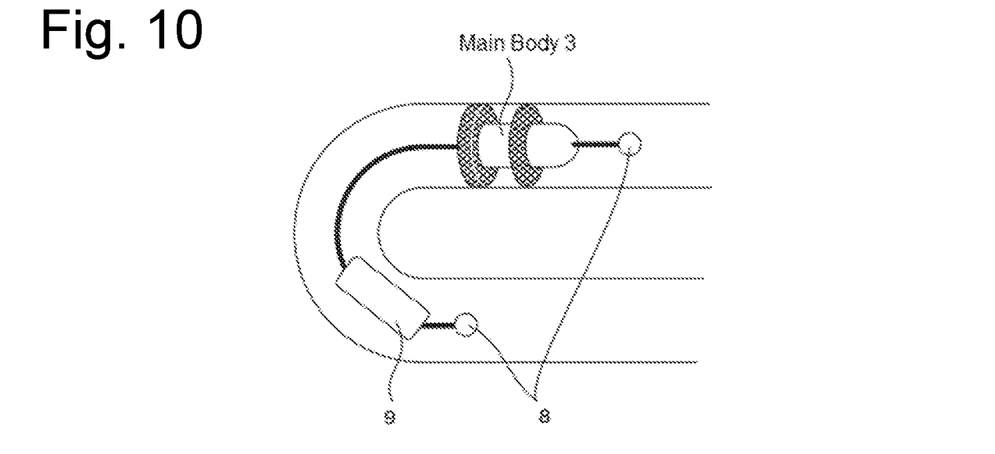
FIG. 10 A schematic view showing the buoyant and linking unit, which passes through a bent portion of a pipe to be inspected, linked with the main body including the transducers by the flexible linking string member.
Figure 11:
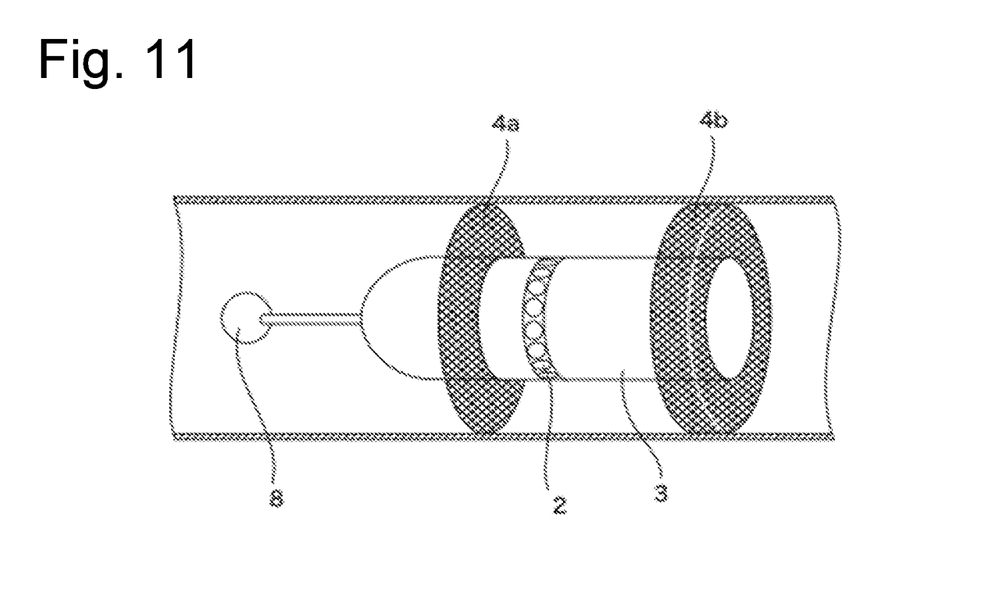
FIG. 11 A schematic diagram showing one example of a buoyant and guiding unit, located at the front side of the main body, which is arranged to provide the main body with buoyancy and to cause the ultrasonic probe to be easily inserted into a pipe to be inspected.

A pulse oscillator, a receiving unit, a power supplying unit, a controlling unit or the like of the transducer 2 of the ultrasonic probe may be provided within the probe itself (not shown). Whereas, these units may be contained within a buoyant and linking unit 9 (distinct from the main body) which is connected to the main body by a flexible linking string (FIGS. 9 and 10). In each of embodiments, these units are so water-proofed as to be protected from flood, and a power supplying cable 30 may be provided together with the flexible liking string linked to the main body 3. With also taking both appropriate buoyancy and pressure of water flow into consideration, it is preferable that, both at the front side position of the main body and at the further rear side of the buoyant and linking unit 9 (which has the power supplying unit etc. therein), a spherical buoyant and guide unit 8 which is made by flexible soft rubber such as PVC is connected by flexible liking string. The buoyant and guide unit may have a plurality of buoyant elements evenly separated on a predetermined length wire. In such aspect, the ultrasonic probe of the present invention can be inserted into the pipe to be inspected with the wire, and the inserted position can be measured by the length of the wire outside of the pipe to be inspected. In such aspect, construction for attaching with the inner surface of the pipe and for matching the central axes of the pipe and the main body is band made by flexible resin fibers. In such arranged embodiment, since the main body stably supporting unit itself may bend, the ultrasonic probe also may smoothly move within the pipe including bent portions (FIG. 12).

Figure 7:
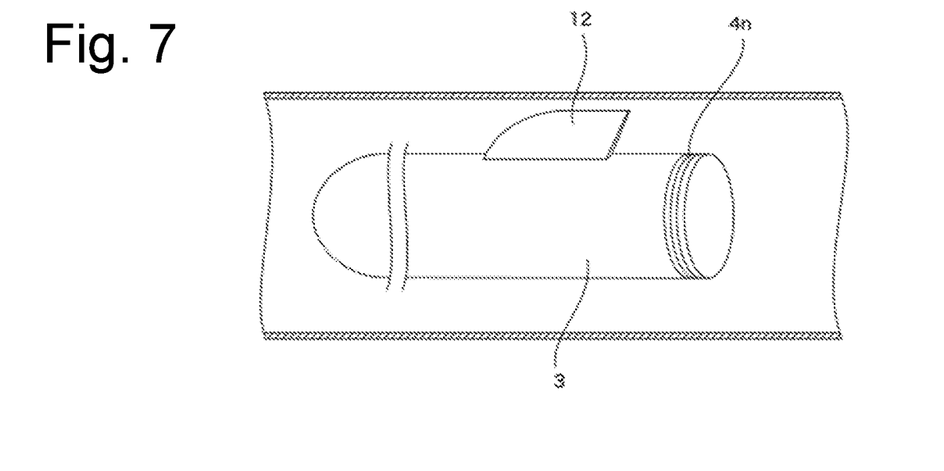
FIG. 7 A perspective view, in another embodiment of the present invention, of one example of a side wing provided at the side surface of the main body for stably moving the main body.

The main body 3 also may have a one or more elastic side wing(s) 12 on a side wall thereof along the central axis in order to, when moving by water flow, make the positional relationship with the pipe stable, and to suppress undesirable rotation of the main body about the axis (FIG. 7). The height of the side wing 12 is smaller than the length between the side surface of the main body and the inner surface of the pipe to be inspected, so that the side wing does not touch the inner surface when moving. The shape of the side wing does not matter on the condition that, in the case where fluid flow at the side of the main body, the main body is not undesirably rotated along the axis. As an example, the wing may be like a general vertical stabilizer of an aircraft.

Figure 6:
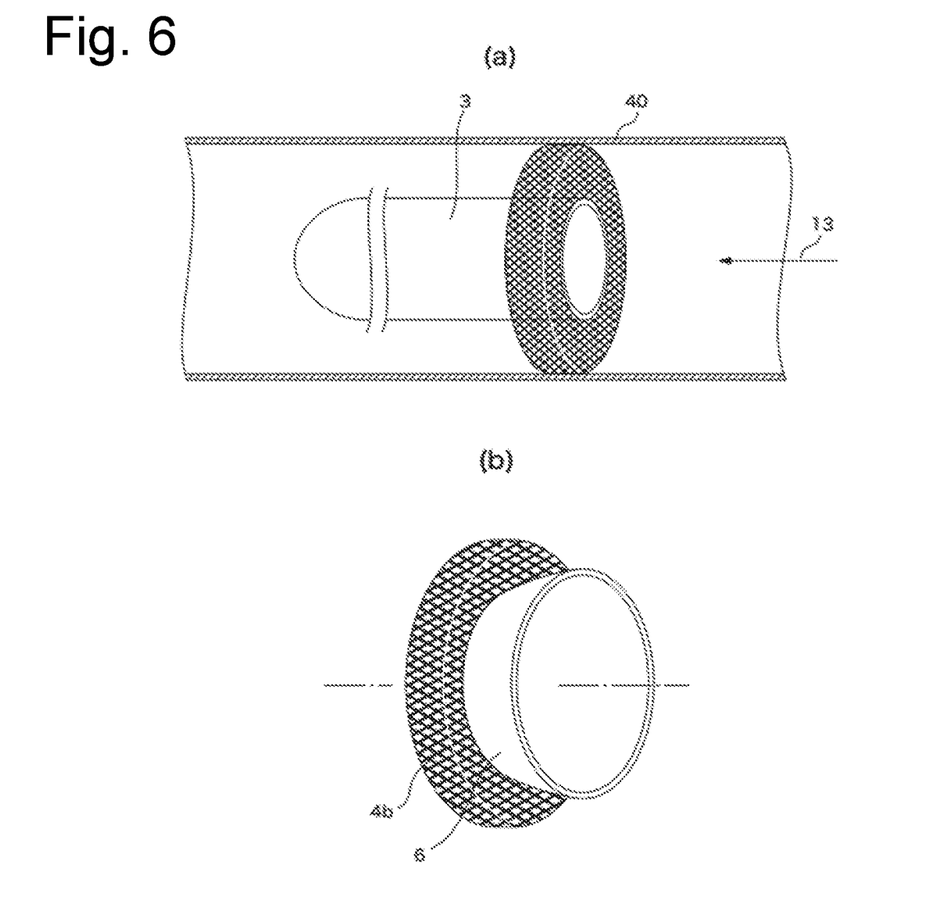
FIG. 6A A schematic diagram of another embodiment of the main body in the present invention, in which a central portion of the rear side part in the main body is formed in concave toward the coaxially inside direction.
FIG. 6B A perspective view, in another embodiment of the present invention, of one example of a rear side fin provided at the rear side of the main body for smoothly moving the main body.

While the main body 3 moves by pressure of water flow from the rear side direction, in order that the pressure can be effectively applied to the main body, the shape of the main body 3 is formed, at the side view, in such a manner that the central portion of the rear side part is concaved toward the coaxially inside direction of a pipe to be inspected (FIG. 6A). Such a concaved shape may be further extending from the position at which both the concaved shape and the rear side wall of the main body 3 are crossed with each other (rear side cover 6). By employing such constructed shape, since the area of the rear part of the main body to which the pressure of water flow for forward moving the main body can be made large, the main body thus can stably move (FIG. 6B). It is further preferable, considering the necessary works for retrieving the main body from the pipe, that the material of such extending part on the main body stably supporting unit at the rear side is elastic. The ultrasonic probe of the present invention is provided a wire connected to outside of the pipe, so that the probe can be removed from the inside of the pipe by pulling the wire, if necessary.

Figure 8:
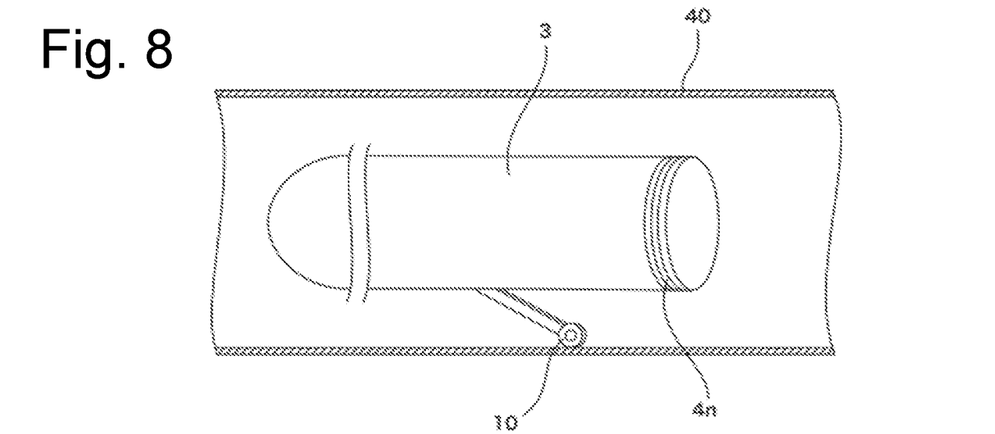
FIG. 8 A perspective view, in another embodiment of the present invention, of one example of a roller provided at the side surface of the main body which is grounded at the inner surface of a pipe to be inspected.

Furthermore, with also providing a roller member 10 contacting the inner surface of the pipe to be inspected, it becomes possible to appropriately recognize the position of the probe within the pipe. The roller member is provided on the side surface of the main body and arranged to contact the inner surface of the pipe by a spring member biasing the roller. As a result, with counting the number of rotations of the roller, it becomes possible to correctly grasp the position of the probe which has been inserted within the pipe in accordance with the number of rotations (FIG. 8).

Another aspect that the ultrasonic probe within the pipe measures the position of the pipe by a wire extending from the rear part of the main body is within the scope of the present invention (FIG. 12). In the event, it is possible to detect the position of the ultrasonic probe, which are evenly spaced on the wire, within the pipe to be inspected by providing buoyant and guide unit which is provided for easily inserting the main body into the pipe against pressure of water flow, or by measuring the remaining of the wire outside the pipe.

Explanation of Symbols

1. Ultrasonic probe, 2. Transducer, 3. Main body, 4. Main body stably supporting unit, 4a. Front side main body stably supporting unit, 4b. Rear side main body stably supporting unit, 4m. Engaging groove, 4n. Main body side engaging groove, 5. Guiding unit, 6. Rear side cover, 7. Flexible linking unit, 8. Buoyant and Guiding unit, 9. Buoyant linking unit, 10. Roller, 11. Pipe (to be inspected), 12. Side wing, 13. Water flow, 14. Wire, 20. Plate-shaped transducer, 30. Power supplying cable, 40. Pipe wall, Kn. Inner pipe surface, Ks. Outer pipe surface

The invention claimed is:

1. An ultrasonic probe movable within a pipe to be inspected for measuring thickness of the pipe from inside of it, comprising:
    a) a cylindrical main body,
    b) a plurality of transducers provided around peripheral of the main body,
    c) a member for matching central axis of the pipe to be inspected and central axis of the main body, the member being arranged around the cylindrical main body and being elastic and coarse mesh umbrella-shaped and
    d) another member for causing the main body to move within the pipe, wherein shape of each of the transducers is so curved as to match the shape of an inner surface of the pipe to be inspected, and
    the ultrasonic probe is movable within the pipe by water flow pressure.

2. The ultrasonic probe according to claim 1, wherein the transducers are concentrically provided about the central axis of the main body.

3. The ultrasonic probe according to claim 1, wherein the transducers are arranged to perpendicularly emit ultrasonic wave toward an inner surface of the pipe, so that the wave perpendicularly reflected from the inner surface can be detected at the transducers.

4. The ultrasonic probe according to claim 1, wherein the main body is cylindrical, and wherein the transducers, the surface of which is curved, are provided at positions circularly designated around the main body, so that the transducers perpendicularly radiate ultrasonic wave onto the inner surface of the pipe and detect perpendicularly reflected waves.

5. A method for measuring thickness of a pipe to be inspected by a cylindrical ultrasonic probe, comprising the steps of:
    1) inserting an ultrasonic probe movable by water flow pressure comprising:
        a) a cylindrical main body, b) a plurality of transducers provided around peripheral of the main body,
c) a member for matching central axis of the pipe to be inspected and central axis of the main body, the member being arranged around the cylindrical main body and being elastic and coarse mesh umbrella-shaped and
d) another member for causing the main body to move within the pipe,
2) radiating ultrasonic waves perpendicularly onto an inner surface of the pipe, and detecting the reflected wave, and
3) determining thickness of the pipe.

\* \* \* \* \*